(12) United States Patent
Lehrer et al.

(10) Patent No.: US 8,579,035 B2
(45) Date of Patent: Nov. 12, 2013

(54) METHOD FOR RECOVERING OIL FROM AN OIL WELL

(75) Inventors: Scott E. Lehrer, The Woodlands, TX (US); Saet B. Debord, Katy, TX (US); Marc N. Lehmann, Houston, TX (US); Nancy C. Means, Needville, TX (US)

(73) Assignee: Baker Hughes Incorporated, Houston, TX (US)

( * ) Notice: Subject to any disclaimer, the term of this patent is extended or adjusted under 35 U.S.C. 154(b) by 431 days.

(21) Appl. No.: 12/845,543

(22) Filed: Jul. 28, 2010

(65) Prior Publication Data

US 2011/0024131 A1 Feb. 3, 2011

Related U.S. Application Data

(60) Provisional application No. 61/230,525, filed on Jul. 31, 2009.

(51) Int. Cl.
*E21B 43/00* (2006.01)

(52) U.S. Cl.
USPC ........................................................ 166/372

(58) Field of Classification Search
None
See application file for complete search history.

(56) References Cited

U.S. PATENT DOCUMENTS

| 4,197,912 A * | 4/1980 | Barnhouse ................. 166/305.1 |
| 4,301,868 A | 11/1981 | Scherubel et al. |
| 4,404,112 A | 9/1983 | Scherubel et al. |
| 5,871,048 A | 2/1999 | Tokar et al. |
| 6,758,277 B2 | 7/2004 | Vinegar |
| 7,464,763 B2 | 12/2008 | Galloway et al. |
| 7,624,804 B2 | 12/2009 | Ramachandran |
| 2002/0029883 A1 | 3/2002 | Vinegar et al. |
| 2004/0177968 A1 | 9/2004 | Ramachandran |
| 2007/0079963 A1* | 4/2007 | Yang et al. ..................... 166/270 |
| 2007/0129257 A1 | 6/2007 | Kippie et al. |
| 2007/0246222 A1 | 10/2007 | Ramachandran |
| 2008/0121397 A1 | 5/2008 | Galloway et al. |
| 2008/0131393 A1* | 6/2008 | Yeung et al. ............... 424/70.11 |
| 2008/0257556 A1* | 10/2008 | Kippie et al. ................. 166/372 |

FOREIGN PATENT DOCUMENTS

| WO | 00/00715 A1 | 1/2000 |
| WO | 01/55553 A1 | 8/2001 |
| WO | 02/059485 A1 | 8/2002 |
| WO | 02/092963 A1 | 11/2002 |
| WO | 2005/093209 A1 | 10/2005 |
| WO | 2007/044166 A2 | 4/2007 |

* cited by examiner

*Primary Examiner* — Shane Bomar
*Assistant Examiner* — Silvana Runyan
(74) *Attorney, Agent, or Firm* — Mossman, Kumar & Tyler, PC

(57) ABSTRACT

In a method for optimizing gas lift operations in the production of crude oil, a surfactant is injected into the an oil well such that the surface tension between a lift gas and the formation fluid being produced is reduced and/or a lift gas-formation fluid foam is formed. The reduction in surface tension and/or foam formation increases the efficiency of the lift gas for lifting the formation fluid to the surface. The surfactant is a silicone resin which may be combined with other surfactants, in some embodiments.

15 Claims, No Drawings

METHOD FOR RECOVERING OIL FROM AN OIL WELL

CROSS REFERENCE TO RELATED APPLICATIONS

This application claims priority from U.S. Provisional Patent Application Ser. No. 61/230,525, filed on Jul. 31, 2009 for "Method for Recovery Oil from an Oil Well."

BACKGROUND OF THE INVENTION

1. Field of the Invention

The invention relates to a method of producing crude oil. The invention particularly relates to a method of producing crude oil using a foam process.

2. Background of the Art

Oil from oil bearing earth formations is usually first produced by the inherent formation pressure of the oil bearing earth formations. In some cases, however, the oil bearing formation lacks sufficient inherent pressure to force the oil from the formation upward to the surface. In other cases, the inherent pressure of an oil-bearing formation can be expended prior to the recovery of all of the recoverable oil so that when the pressure of the production zone has been reduced by continued withdrawal, the well will stop flowing. When this occurs, artificial methods of lifting the oil from the formation to the surface are usually employed.

One method of continuing production is to provide mechanical pumping operations wherein the pump is located at the surface. Another popular method for achieving production from wells that no longer are capable of natural flow is by the gas lift method.

Gas injection into an oil well is a well-known artificial lift method for facilitating oil recovery from the oil well. This method is commonly referred to as gas lift recovery or, most often, simply as a gas lift. A typical gas lift method provides a lift gas at the surface that is conveyed to a surface wellhead connection where the lift gas is injected into the casing-tubing annulus of the well. Upon injection, the lift gas travels down the casing-tubing annulus to a plurality of specially designed subsurface gas injection valves that enable the lift gas to enter the tubing string. The lift gas commingles with the formation fluids in the tubing string, lifting the formation fluids up the tubing string to the surface.

There are significant operational costs associated with gas injection. Lift gas is not free either in direct costs or associated energy costs. While determining the optimum gas flow is an important element in gas lift methods, it is by no means the only factor that should be considered when optimizing a gas lift method for recovering oil from an oil well.

It would be desirable in the art of producing oil from oil wells to economically produce oil using a gas lift method. It would be particularly desirable to reduce the cost of producing crude oil using a gas lift method of recovery.

SUMMARY

In one aspect, the invention is a method for recovering oil from a gas-lifted oil well penetrating a subterranean oil-bearing formation, the method including: injecting a lift gas into the oil well or utilizing a naturally occurring gas already in the well; and injecting a surfactant and a diluent into the oil well, wherein the surfactant functions to: (a) reduce the surface tension between the formation fluids and the lift gas; (b) create a lift gas-formation fluid foam; or (c) both (a) and (b); the surfactant and diluent are injected into the oil well at a depth sufficiently deep to lift formation fluids to the surface; and the surfactant is a silicone resin.

DETAILED DESCRIPTION

In one embodiment, the invention may be a method for recovering oil from a gas-lifted oil well penetrating a subterranean oil-bearing formation. For the purposes of this disclosure, the term gas lift means a method of recovering oil from an oil well wherein crude oil is converted into a foam and conveyed to the surface in form of foam. The gas for this method may be introduced by the well operator or may be already present naturally. Examples of such naturally present gases are carbon dioxide and/or natural gas.

The method of the disclosure may be used with any gas lift method known to be useful to those of ordinary skill in the art of producing oil. For example the method of the disclosure can be used with the gas lift method disclosed in U.S. Pat. No. 5,871,048 to Tokar, et al, which is fully incorporated herein by reference.

In Tokar, a method for automatically determining an optimum gas injection rate for a gas-lifted oil well is disclosed. The optimum gas-lift slope for the oil well is initially provided and stored in the memory of a programmable logic controller. A lift gas is injected into the well at an initial gas injection rate to displace a liquid at an initial liquid production rate from the well. The initial liquid production rate and initial gas injection rate are stored in the memory. Thereafter, the lift gas is injected into the well at a first incremental gas injection rate differing from the initial gas injection rate by a first incremental value. Additional liquid is displaced from the well at a first incremental liquid production rate and the first incremental liquid production rate and first incremental gas injection rate are stored in the memory. The first incremental slope is determined from the stored data points and compared to the optimum gas-lift slope. The procedure is repeated for a second incremental gas injection rate, wherein the second incremental value is selected as either positive or negative in response to the comparison of the first incremental slope and the optimum gas-lift slope. The second incremental slope is determined from the stored data points and compared to the optimum gas-lift slope. In response to this comparison, the first incremental gas injection rate is determined to be the optimum gas injection rate or the above-recited procedure is repeated for a third incremental gas injection rate and additional incremental gas injection rates, if necessary, until an incremental gas injection rate is determined to be the optimum gas injection rate.

The method of the disclosure can also be used with less complex gas lift methods. The method of the disclosure may be used with any gas lift method as long as the gas lift method serves the functions of lifting formation fluids to the surface which then results in a lower pressure at the producing strata which in turn results in an increased inflow of formation fluids into the well bore. In all of these methods, the gas injection is done at a depth sufficient to lift formation fluid to the surface and allow for the inflow of additional formation fluid into the well bore. Any combination equipment and methods can be used with the method of the disclosure as long as it meets these two basic criteria.

In another embodiment, the method for recovering oil from a gas-lifted oil may include a step of injecting a lift gas into the oil well. Any lift gas known to be useful to those of ordinary skill in the art of using gas lift recovery methods can be used with the method of the disclosure. One gas commonly used as a lift gas with the method of the disclosure is natural gas, preferably that recovered from the same formation as the well subject to the gas lift method. Other gases can also be used including those selected from the group consisting of carbon dioxide, methane, ethane, propane, nitrogen, and mixtures thereof. Any gas that is not detrimental to the formation, such as oxygen, can be used with the method of the disclosure.

In yet another embodiment, the method of the disclosure is a method for recovering oil from a gas-lifted oil well including the step of injecting a surfactant into the oil well. The surfactants useful with the method of the disclosure function to reduce the surface tension between the lift gas and the formation fluid being lifted to the surface and/or create a foam of the lift gas and the formation fluid. This decreased surface tension and/or foam formation allows for a decrease in the density of the formation fluid which results in an increase in lift efficiency.

The method of the disclosure is directed towards the unloading of crude oil from an oil well. This is distinguished from unloading brine and/or condensate from gas wells. The crude oil that is unloaded using the method of the disclosure may have an API gravity of less than or equal to 45.

The surfactants useful with the invention of the disclosure include a silicone resin. Silicone resins are highly crosslinked polymeric siloxane systems. The crosslinking is introduced through the incorporation of trifunctional and tetrafunctional silanes with monofunctional or difunctional, or both, monomer units during manufacture of the silicone resin. As is well understood in the art, the degree of crosslinking that is required in order to result in a silicone resin will vary according to the specific silane units incorporated into the silicone resin. In general, silicone materials which have a sufficient level of trifunctional and tetrafunctional siloxane monomer units (and hence, a sufficient level of crosslinking) such that they dry down to a rigid, or hard, film are considered to be silicone resins.

The ratio of oxygen atoms to silicon atoms is indicative of the level of crosslinking in a particular silicone material. Silicone materials which have at least about 1.1 oxygen atoms per silicon atom will generally be silicone resins as used herein. In some embodiments, the ratio of oxygen:silicon atoms is at least about 1.2:1.0. Silanes used in the manufacture of silicone resins include monomethyl-, dimethyl-, monophenyl-, diphenyl-, methylphenyl-, monovinyl-, and methylvinyl-chlorosilanes, and tetra-chlorosilane, with the methyl-substituted silanes being most commonly utilized.

One silicone resin useful with the method of the disclosure is marketed under the trade designation Dow Corning 1250. This resin has a molecular weight of about 5770 and Mn of about 3160. Such commercially available silicone resins will generally be supplied in an unhardened form in a low viscosity volatile or nonvolatile silicone fluid.

The surfactant may be introduced downhole in combination with a diluent. The diluents may function to decrease the concentration of the silicone resin for easier dispersion within the wellbore. More importantly, the diluents also functions to vaporize slowly in the wellbore to facilitate greater foam production. The diluents are selected to be compatible with silicone resin and any other components present with the resin at the time of injection downhole. Exemplary diluents include, but are not limited to, diesel oil, xylenes, toluene, kerosene, gasoline and the like and combinations thereof.

The method of the disclosure may reduce the cost of recovery of oil from a gas-lift oil well in at least two ways. A first way that the costs can be reduced in recovering oil from a well wherein the rate of recovery is limited by the amount of gas that can be injected, is by increasing the amount of formation fluids being recovered per unit of gas used. With the method of the disclosure, oil may be recovered more quickly reducing the duration of the maintaining the well with its incumbent costs.

A second way that the method of the disclosure can reduce production costs is, in a well wherein the rate of recovery in not limited by the amount of gas which can be injected, is by reducing the amount of gas which must be injected. Since the lift gas lifts more efficiently, less gas is needed to lift the same amount of formation fluids as compared to a conventional gas lift well operation. Particularly in applications wherein there is not sufficient gas available from the formation being produced and other gasses such as nitrogen or carbon dioxide is being purchased, this can result in a substantial savings as compared to conventional gas lift technology. For purposes of the present application, the term formation fluids means those fluids produced from a oil bearing subterranean formation including but not limited to oil, natural gas, water and the like. Crude oil means formation fluids that include oil, condensate, and the like.

In addition to decreasing the surface tension between the formation fluid and lift gas, the surfactants useful with the method of the disclosure are desirably non-corrosive.

The surfactant formulations useful with the method of the application may include solvents. If used, it may be desirable to use solvents that do not strip off at the formation temperature or well operating temperature. Failure to use such surfactants may leave residue on the gas lift system possibly choking the system. In applications of the method of the disclosure, the surfactant may be formulated using solvents which will not leave residue on the gas lift system.

One advantage of using a solvent is that it can be used to mitigate premature vaporization of the diluents. A lower boiling diluent, such as toluene, can be injected with a higher boiling solvent, such as naphtha, resulting in a admixture that can be injected into an oilwell that would be to hot for the use of toluene diluents alone.

In addition to silicone resins, other surfactants may be used in combination with the silicone resins. Preferably, such surfactants used with the method of the disclosure are thermally stable at the formation temperature or well operating temperature of the well being treated. Failure to use such surfactants can lead to the loss of efficiency of the gas lift system as the surfactants break down. Surfactant break down products can also cause problem downstream. As such temperatures can exceed 250° F. (121° C.) and even reach 300° F. (149° C.) and above, it is desirable that for very high temperature environments, the surfactant be a sultaine or a hydroxy sultaine or salt there of.

When the surfactant is a sultaine salt, it preferably has the general formula:

wherein R is a hydrocarbon side chain, and m varies from 1-100. The counter ion may be any including Na+, K+ and the like.

When the surfactant is a hydroxy sultaine salt thereof, it preferably has the general formula:

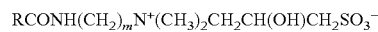

where R is as previously defined. The counter ion may be any including Na+, K+ and the like.

The hydrocarbon side chains designated as R in the above general formulae are, in some embodiments, aliphatic linear or branched chains having from 2 to 20 carbons. In some embodiments, the side chains are linear alkanes have from 10 to 16 carbons. In one embodiment, the side chain is a lauryl ($C_{12}$) group.

The surfactants useful with the invention may also include, but are not limited to betaines, organic phosphonates, alkyl sulfonates, and the like. Any surfactant that is compatible with a system including a silicone resin, a diluent, and optionally a solvent may be used with the method of the disclosure. Such surfactants as may have a synergistic effect with the silicone resins may be especially desirable.

Those of ordinary skill in art of performing gas lift operations on oil wells know how to determine the desired level of surfactants to be used with embodiments of the invention. For example, in one embodiment, the operator may elect to start feeding a fixed amount of surfactant and then, by trial and error, make adjustments to optimized feed levels in view of changes to production rates. In other embodiment, the operator of the well may choose to perform a test modeling his well in order to predict an optimum feed rate. Variables associated with an oil well that may affect dosing levels of the additives may include the type of hydrocarbon being produced, the quantity of hydrocarbon being produced, the quantity of brine present in the production fluid, the presence of inorganic materials in the brine, the pressure of the reservoir, the amount of gas that can be injected down hole, and the like.

Where, in the practice of the method of the disclosure, the surfactants function to create a foam, it is sometimes desirable to break the foam after it is recovered from the well. The term "breaking a foam", for the purposes of the disclosure, means to separate the gaseous component of the foam from the liquid component. Any method known to be useful to those of ordinary skill in the art of breaking foams may be used with the method of the disclosure, including both chemical and mechanical methods.

EXAMPLE

The following example is provided to illustrate certain embodiments of the disclosure. The example is not intended to limit the scope of the method of the disclosure and should not be so interpreted. Amounts are in weight parts or weight percentages unless otherwise indicated.

Example 1

The Foaming tests were conducted using a sample of 25 gravity raw crude oil. The general procedure used to conduct these foaming tests was as follows:

1) Preweigh 25 cm length×2.5 cm glass culture tubes.
2) Add 20 μm of crude, then specified foamer, followed by diluent.
3) Reweigh tube to get initial wt. and measure height with a ruler in cm.
4) Place tubes vertically individually in 38° C. water bath with a 70 rpm orbital shake for at least 15 minutes.
5) Remove tubes individually and sparge with methane at 3100 ml/min for 3 minutes with tubes placed vertically into a beaker to capture any foam-over.
6) Measure total height; if foam has risen above the top of the tube (foam-over), record as 25 cm height and record time to foam-over.
7) For tubes with foam-over, carefully remove sparger scraping off as much foam as possible from sparger into tube.
8) For tubes with foam-over, wipe off outside to remove any foam sticking to tubes and reweigh; record this as the final weight.

The silicone resin used is DOW CORNING 1250. This material is characterized as a polytrimethylhydrosilylsiloxane. The diluent is xylenes. The data for this example is shown below in the Table.

TABLE

| Example # | [Diluent] % | [Resin]% | $2^{nd}$ Surfactant | [$2^{nd}$ Surf.] % | Foam Height | Foam Unloaded (g) |
|---|---|---|---|---|---|---|
| Control A* | 15 | — | — | | 9.2 | 0 |
| Control B* | — | 2 | — | | 10.8 | 0 |
| Control C* | — | 6 | — | | 17.8 | 0 |
| Control D* | 15 | — | Lauryl Betaine | 2 | 7.6 | 0 |
| Control E* | 15 | — | Lauryl Hydroxy Sultaine | 2 | 6.5 | 0 |
| 1 | 15 | 2 | — | | 25 | 8.8 |
| 2 | 15 | 3 | — | | 25 | 9.1 |
| 3 | 15 | 1 | — | | 14.1 | 0 |
| 4 | 15 | 1 | Lauryl Betaine | 2 | 25 | 4 |
| 5 | 15 | 1 | Lauryl Hydroxy Sultaine | 2 | 25 | 3.6 |

*Not an example of the invention

The invention claimed is:

1. A method for recovering crude oil from a gas-lifted oil well penetrating a subterranean oil-bearing formation, the method including: injecting a lift gas into the oil well or utilizing a naturally occurring gas already in the well; and injecting a composition consisting essentially of a silicone resin surfactant and optionally one or more of the members selected from the group consisting of a diluent, a solvent, and a second different surfactant, into the oil well, wherein the surfactant functions to:
   (a) reduce the surface tension between the crude oil and the lift gas;
   (b) create a lift gas-crude oil foam; or
   (c) both (a) and (b); and
   wherein the surfactant and diluent are injected into the oil well at a depth sufficiently deep to lift the crude oil to the surface.

2. The method of claim 1 wherein the crude oil has an API gravity of less than or equal to about 45.

3. The method of claim 1 wherein the silicone resin has a ratio of oxygen atoms to silicon atoms (O:Si) of at least about 1.1.

4. The method of claim 3 wherein the silicone resin has a ratio of oxygen atoms to silicon atoms (O:Si) of at least about 1.2.

5. The method of claim 1 wherein the silicone resin is selected from the group consisting of monomethyl-, dimethyl-, monophenyl-, diphenyl-, methylphenyl-, monovinyl-, methylvinyl-chloro-, tetra-chloro-silanes and combinations thereof.

6. The method of claim 1 wherein the silicone resin is a methyl substituted silane.

7. The method of claim 1 wherein the diluent is selected from the group consisting of diesel oil, xylenes, toluene, kerosene, gasoline, and combinations thereof.

8. The method of claim 1 wherein the solvent is selected such that it does not strip off at the formation temperature or well operating temperature.

9. The method of claim 1 wherein the different second surfactant is selected from the group consisting of a sultaine, a hydroxy sultaine, a salt of a sultaine or a hydroxy sultaine, and combinations thereof.

10. The method of claim 1 wherein the different second surfactant is selected from the group consisting of betaines, organic phosphonates, alkyl sulfonates, and combinations thereof.

11. The method of claim 1 further comprising recovering the oil in a foamed state and breaking the foam.

12. The method of claim 1 wherein the lift gas is injected into the oil well.

13. The method of claim 2 wherein the lift gas is selected from the group consisting of carbon dioxide, methane, ethane, propane, nitrogen, and mixtures thereof.

14. The method of claim 1 wherein the lift gas is naturally occurring.

15. The method of claim 14 wherein the naturally occurring lift gas is selected from the group consisting of carbon dioxide, and natural gas, and mixtures thereof.

* * * * *